Feb. 5, 1935. R. J. MEYER 1,990,341
BORING TOOL
Filed March 1, 1932
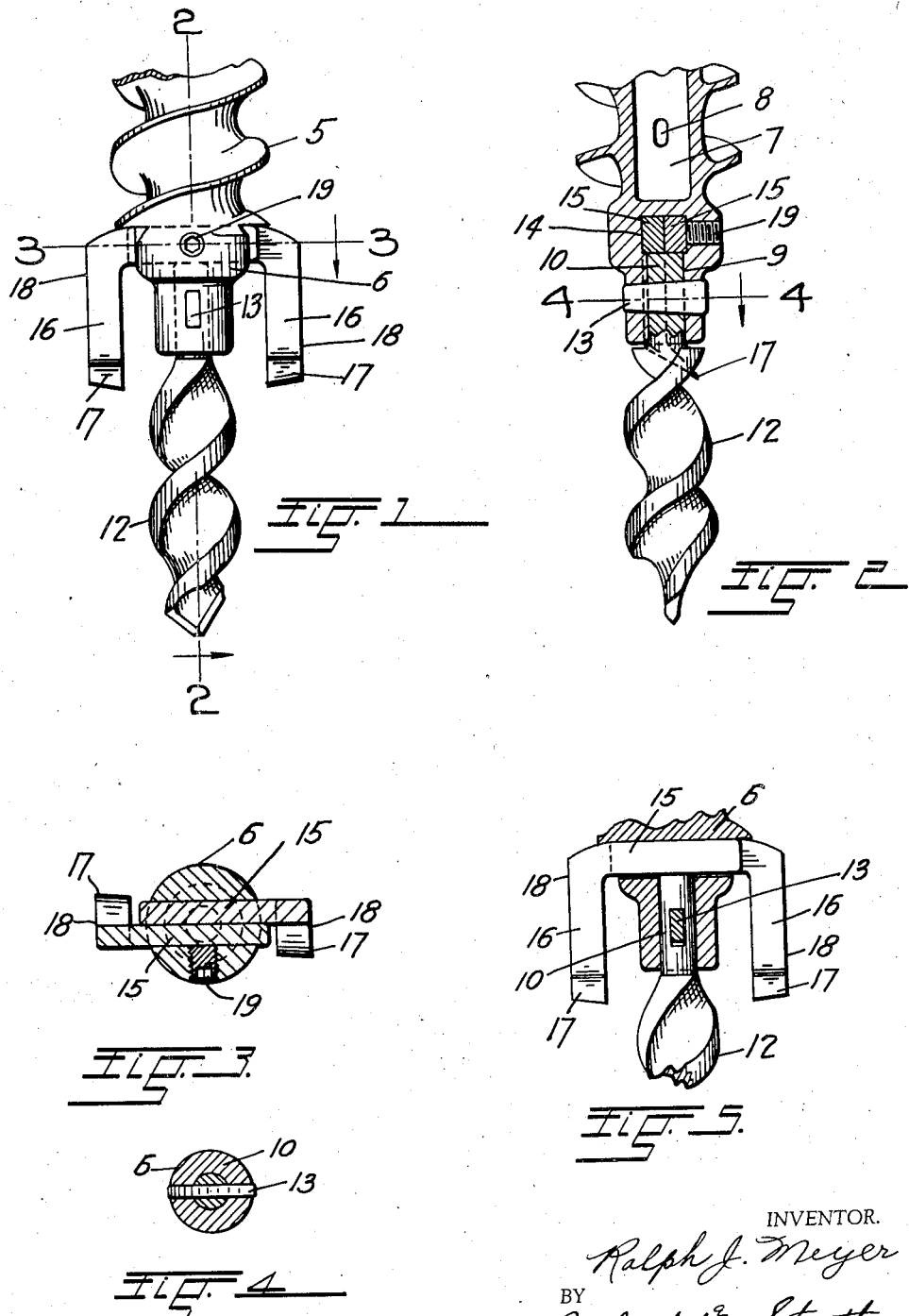
INVENTOR.
Ralph J. Meyer
BY
Rollandet & Stratton
ATTORNEYS.

Patented Feb. 5, 1935

1,990,341

UNITED STATES PATENT OFFICE 1,990,341

BORING TOOL

Ralph J. Meyer, Denver, Colo.; Judith L. Meyer administratrix of said Ralph J. Meyer, deceased Application March 1, 1932, Serial No. 596,024

5 Claims. (Cl. 255—69)

This invention relates to boring tools and more particularly to boring tools adapted for use in coal mining.

It is an object of the invention to provide a tool of this kind having parts of very efficient cutting capacity, which in the operation of the tool co-operate to advance the tool into earth formation with the minimum of effort, and with a greatly reduced resistance owing to the continuous removal of cuttings from the bore.

Another object is to provide in a tool of the above described character, adjustable cutters to vary the cross-sectional size of the bore, and still further objects reside in details of construction and a novel arrangement of parts as will hereinafter be described with reference to the accompanying drawing.

In the drawing, in the several views of which like parts are similarly designated, Figure 1 represents a broken side elevation of the cutting-element of the tool, Figure 2, a section on the line 2—2, Figure 1, Figure 3, a transverse section taken on the line 3—3, Figure 1, Figure 4, a section on the line 4—4, Figure 2, and Figure 5, a fragmentary section of the chuck of the tool in a plane at right angles to that of Figure 2.

The tool as shown comprises a stem 5 spirally grooved for the outward conveyance of cuttings from a bore into which the tool is advanced, and terminating in a chuck 6.

The stem is longitudinally bored as at 7 and provided with side openings 8 to receive a key for the connection of an extension, the stem being preferably made in sections to extend its length in accordance with the depth to which the tool is advanced into the formation.

The chuck is axially bored as at 9 to receive the shank 10 of an auger-shaped pilot or leader-bit 12. The shank 10 fits snugly in the bore of the chuck, and a wedge-shaped key 13, in correspondingly shaped key-ways of the chuck and the shank firmly holds the bit in place.

At the end of the chuck-bore is a transverse passage 14 to receive the lapping shanks 15 of two cutters 16 which project at opposite sides of the tool in substantially parallel relation to the axis of the same. The working parts of these cutters extend at substantially right angles to their shanks which are flat to conjointly fit into the passage of the chuck.

The end-portions 17 of the working parts of the cutters are bent at an angle thereto in opposite directions, and sharpened to cut into a formation into which the tool is advanced by the rotary movement of the pilot-bit 12, and the said working parts are furthermore sharpened at their outer longitudinal edges, as at 18, to ream the bore formed by the cutting edges at the ends of the cutters.

The cutters are rigidly fastened in the chuck by frictional engagement with the shanks of the cutters of the end of the shank 10 of the pilot-bit, driven inwardly by the wedging action of the key 13. In order to further secure the cutters, a set screw 19 in a threaded opening of the chuck may be employed to clampingly engage the shank of one of the cutters at a side of the passage in which the lapping shanks are inserted.

In the operation of the tool, it is rotated by a suitable mechanism applied at the end of its stem, and owing to the spiral twist of the stem, cuttings produced in the operation, are continuously removed to and through the mouth of the bore.

By adjustment of the cutters 16, after their shanks have been loosened in the transverse passage 14 of the chuck, the diameter of the bore produced in the operation of the tool may be varied to any desired size within determined limits.

The pilot-bit 12 is of peculiar construction and adds much to the successful operation of the tool. The bit tapers from its lower end upwardly, as shown in the drawing, to prevent its binding in the bore, its spiral face is wide so that it will bear on the surface of the bore and thereby guide the tool to follow its true course and the bit is, moreover, made of considerable length in comparison with other bits used for a similar purpose, in order to prevent lateral displacement and again compel the bit to follow its true downward course.

What I claim and desire to secure by Letters Patent is:

1. A boring tool comprising a stem having a chuck provided with a bore and a transverse passage, cutters having shanks slidable in the passage, a pilot-bit having a shank in the bore abutting the shanks of the cutters, a set screw on the chuck abutting a shank of one of the cutters, and means for securing the bit independently of the set screw.

2. A boring tool comprising a stem having a chuck provided with a bore and a transverse passage, cutters having shanks slidable in the passage, a pilot-bit having a shank in the bore abutting the shanks of the cutters, a set screw on the chuck abutting a shank of one of the cutters, and a wedge bearing against the bit shank and thereby holding the shanks of the cutters in position.

3. A boring tool comprising a stem having a chuck provided with a bore and a diametrically transverse passage at the inner end of the bore, a pair of cutters having overlapping shanks mounted for slidable adjustment with respect to each other in said passage, a pilot bit having a shank in the bore, the entire upper end of which abuts against the lower faces of the shanks of the first-mentioned cutters, and means to force the pilot bit shank against the cutter shanks to lock them in position throughout the range of their adjustment.

4. A boring tool comprising a stem having a chuck provided with a bore and a diametrically transverse passage at the inner end of the bore, a pair of cutters having overlapping shanks mounted for slidable adjustment with respect to each other in said passage, a pilot bit having a shank in the bore, the entire upper end of which abuts against the lower faces of the shanks of the first-mentioned cutters, and means to force the pilot bit shank against the cutter shanks to lock them in position throughout the range of their adjustment, said pilot bit being screw shaped to urge the cutters into the bored hole.

5. A boring tool comprising a stem having a chuck provided with a bore and a diametrically transverse passage at the inner end of the bore, a pair of cutters having overlapping shanks mounted for slidable adjustment with respect to each other in said passage, a pilot bit having a shank in the bore, the entire upper end of which abuts against the lower faces of the shanks of the first-mentioned cutters, and means to force the pilot bit shank against the cutter shanks to lock them in position throughout the range of their adjustment, said pilot bit being screw shaped to urge the cutters into the bored hole, said cutters extending parallel to the axis of the chuck and pilot bit and being spaced throughout from said chuck and pilot bit to leave free spaces for the passage of chips.

RALPH J. MEYER.